US009644986B2

United States Patent
Kumagai

(10) Patent No.: US 9,644,986 B2
(45) Date of Patent: May 9, 2017

(54) DRIVE SUPPORT SYSTEM AND DRIVE SUPPORT METHOD

(71) Applicant: MITSUBISHI ELECTRIC CORPORATION, Tokyo (JP)

(72) Inventor: Taro Kumagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/893,164

(22) PCT Filed: Sep. 9, 2013

(86) PCT No.: PCT/JP2013/074255
§ 371 (c)(1),
(2) Date: Nov. 23, 2015

(87) PCT Pub. No.: WO2015/033470
PCT Pub. Date: Mar. 12, 2015

(65) Prior Publication Data
US 2016/0282133 A1    Sep. 29, 2016

(51) Int. Cl.
*G01C 21/00* (2006.01)
*G01C 21/36* (2006.01)
*B60R 1/00* (2006.01)
*B60R 11/02* (2006.01)
*B60K 35/00* (2006.01)

(52) U.S. Cl.
CPC ......... *G01C 21/3667* (2013.01); *B60K 35/00* (2013.01); *B60R 1/00* (2013.01); *B60R 11/02* (2013.01); *B60R 2300/205* (2013.01); *B60R 2300/70* (2013.01)

(58) Field of Classification Search
CPC combination set(s) only.
See application file for complete search history.

(56) References Cited

U.S. PATENT DOCUMENTS 8,909,428 B1 * 12/2014 Lombrozo ........... B62D 15/025
701/41
2007/0032929 A1    2/2007 Yoshioka et al.
2007/0124027 A1    5/2007 Betzitza et al.
(Continued)

FOREIGN PATENT DOCUMENTS

JP    2001-194161 A    7/2001
JP    2006-092129 A    4/2006
(Continued)

*Primary Examiner* — Hussein A. Elchanti
(74) *Attorney, Agent, or Firm* — Birch, Stewart, Kolasch & Birch, LLP

(57) ABSTRACT

A drive support system includes a motion information acquiring unit 1 that acquires motion information of a driver of a vehicle; a vehicle information acquiring unit 2 that acquires vehicle information about a state of the vehicle; a controller 4 that decides drive support contents corresponding to the motion pattern matching the motion information of the driver and to the state of the vehicle the vehicle information indicates from the support condition data that records drive support contents corresponding to a motion pattern of a driver to be provided with the drive support and the state of the vehicle; and an information presentation unit 6 that presents the drive support contents the controller 4 decides.

15 Claims, 11 Drawing Sheets

(56) References Cited

U.S. PATENT DOCUMENTS

| | | | | |
|---|---|---|---|---|
| 2007/0299584 A1* | 12/2007 | Okamoto | ............... | B60R 1/00 |
| | | | | 701/41 |
| 2013/0274958 A1* | 10/2013 | Uno | ............... | B60W 20/00 |
| | | | | 701/1 |
| 2015/0379362 A1* | 12/2015 | Calmes | ............... | G06K 9/2036 |
| | | | | 348/136 |
| 2016/0246298 A1* | 8/2016 | Sato | ............... | B60Q 9/00 |

FOREIGN PATENT DOCUMENTS

| | | |
|---|---|---|
| JP | 2007-047914 A | 2/2007 |
| JP | 2007-506166 A | 3/2007 |
| JP | 2009-234508 A | 10/2009 |
| JP | 2010-018072 A | 1/2010 |
| JP | 2010-184534 A | 8/2010 |
| JP | 2011-086204 A | 4/2011 |
| JP | 2012-168196 A | 9/2012 |

\* cited by examiner

| ID | Support Condition | Motion Pattern | Support Information | Support Cancellation Condition |
|---|---|---|---|---|
| 001 | Less than 10 km/Hour | Leaning Forward and Looking Right or Left | Front Camera Image (Left or Right) | Not Less than 10 km/Hour |
| 002 | Less than 20 km/Hour | Leaning Forward and Facing Downward | Top View Image | Not Less than 20 km/Hour |
| ⋮ | ⋮ | ⋮ | ⋮ | ⋮ |

FIG. 9

| ID | Support Condition | Trigger Action | Magnitude of Motion | Support Contents | Support Cancellation Condition |
|---|---|---|---|---|---|
| 001 | Less than 10 km/Hour | Leaning Forward and Looking Right or Left | 3 | Front Camera Image (Left or Right) | Not Less than 10 km/Hour |
| 002 | Less than 20 km/Hour | Leaning Forward and Facing Downward | 2 | Top View Image | Not Less than 20 km/Hour |
| ... | ... | ... | ... | ... | ... |

FIG.11

| ID | Recording Date | Support Condition | Trigger Action | Place | Magnitude of Motion | Support Contents | Support Cancellation Condition |
|---|---|---|---|---|---|---|---|
| 001 | Mar.9, 2001 | Less than 10 km/Hour | Leaning Forward and Looking Right or Left | Latitude: ◯ Longitude: △ | 3 | Front Camera Image (Left or Right) | Not Less than 10 km/Hour |
| 002 | Apr.1, 2011 | Less than 20 km/Hour | Leaning Forward and Facing Downward | Latitude: ◯ Longitude: △ | 2 | Top View Image | Not Less than 20 km/Hour |
| ... | ... | ... | ... | ... | ... | ... | ... |

DRIVE SUPPORT SYSTEM AND DRIVE SUPPORT METHOD

TECHNICAL FIELD

The present invention relates to a drive support system and a drive support method that give appropriate drive support in response to a motion of a driver.

BACKGROUND ART

Conventionally, techniques have been proposed which support driving by switching display contents of onboard equipment to an image of a driver's blind spot taken with an on-vehicle camera (front camera, for example) in response to a user operation (pushing down of a button, for example).

In addition, there is a technique that supports the driving when the driver's vehicle travels within a prescribed speed by switching to a camera image outside the vehicle taken with an on-vehicle camera.

Thus, according to the conventional techniques, they are likely to distract attention from driving because the display contents of the onboard equipment are not switched to a camera image without a particular operation different from the driving operation (such as a touch operation).

In addition, when switching to the display contents of the onboard equipment in accordance with the speed of the vehicle, even if the driver does not want to refer to a camera image, the display contents are switched, which is annoying to the driver.

As a conventional technique that gives drive support by displaying an image of a driver's blind spot taken with a camera, there is a system disclosed in a Patent Document 1, for example. The system makes conjectures as to an image of a blind spot for a driver from images taken with cameras installed inside and outside a vehicle, and presents the image.

In addition, as a conventional technique that gives drive support without requiring any particular user operation, there is a drive support system disclosed in a Patent Document 2, for example.

The system records operation contents peculiar to a driver in advance, which are performed at an event such as congestion, (an instruction operation for route guidance to a navigation system, for example), and executes the operation contents corresponding to it.

PRIOR ART DOCUMENT

Patent Document

Patent Document 1: Japanese Patent Laid-Open No. 2010-184534.
Patent Document 2: Japanese Patent Laid-Open No. 2010-18072.

DISCLOSURE OF THE INVENTION

Problems to be Solved by the Invention

The conventional technique typified by the Patent Document 1 presents a blind spot image regardless of whether the driver wants it to display the blind spot image or not. Thus, the driver is likely to feel annoying because of the sudden display of the blind spot image having nothing to do with the driving of the vehicle.

In addition, since the Patent Document 1 conjectures the driver's blind spot from information about the driver's line of sight or from an image taken with an outward camera, the processing load of the system is large, thereby offering a problem of requiring a high performance, expensive system.

On the other hand, the conventional technique typified by the Patent Document 2 records an operation executed after the occurrence of a certain event as the operation corresponding to the event. Accordingly, if no operation is conducted after the occurrence of the event, a problem arises of not executing any recording processing.

In addition, when the operation of switching the camera image is related to the event that the speed of the vehicle falls within a particular speed range, even if the driver does not want to refer to the camera image, the system described in the Patent Document 2 executes the switching operation to the camera image automatically when the vehicle speed falls within the speed range.

The present invention is implemented to solve the foregoing problems. Therefore it is an object of the present invention to provide a drive support system and a drive support method capable of giving drive support with appropriate contents at appropriate timing for a driver.

Means for Solving the Problems

A drive support system in accordance with the present invention comprises a motion information acquiring unit that acquires motion information of a driver of a vehicle; a vehicle information acquiring unit that acquires vehicle information about a state of the vehicle; an information storage that stores as history information a location where the drive support was given and drive support contents corresponding to the state of the vehicle at the time; a positional information acquiring unit that acquires positional information of the vehicle; a controller that decides drive support contents corresponding to a motion pattern matching the motion information of the driver and to the state of the vehicle the vehicle information indicates from support condition data which records the drive support contents corresponding to the motion pattern of the driver to be provided with drive support and corresponding to the state of the vehicle, and that selects the drive support contents in the history information when the controller decides from the positional information of the vehicle the positional information acquiring unit acquires that the vehicle is approaching the location where the drive support in the history information was given, and when the state of the vehicle the vehicle information indicates matches the state of the vehicle in the history information; and an information presentator that presents the drive support contents the controller decides or the drive support contents the controller selects.

Advantages of the Invention

According to the present invention, it offers an advantage of being able to give the drive support with appropriate contents at appropriate timing for the driver.

BRIEF DESCRIPTION OF THE DRAWINGS

FIG. 9 is a table showing an example of support condition data in the embodiment 5;

FIG. 11 is a table showing an example of history information in the embodiment 5.

BEST MODE FOR CARRYING OUT THE INVENTION

The best mode for carrying out the invention will now be described with reference to the accompanying drawings to explain the present invention in more detail.

Embodiment 1

Figures 1, 2:
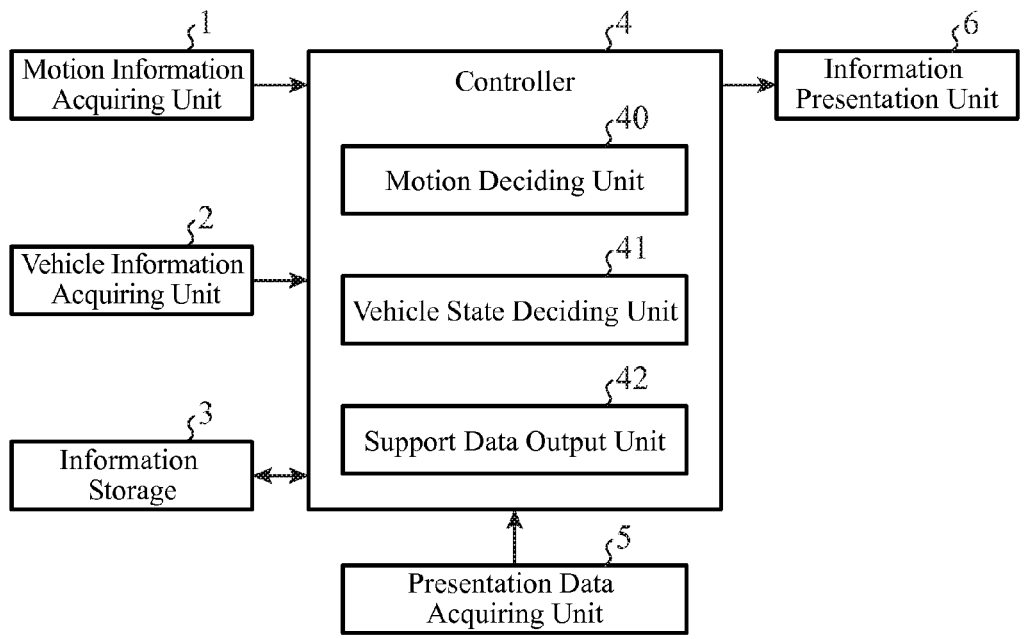
FIG. 1 is a block diagram showing a configuration of a drive support system of an embodiment 1 in accordance with the present invention.
FIG. 2 is a table showing an example of support condition data in the embodiment 1.

FIG. 1 is a block diagram showing a configuration of a drive support system of an embodiment 1 in accordance with the present invention. In addition, FIG. 2 is a table showing an example of support condition data in the embodiment 1.

The drive support system shown in FIG. 1, which is a system mounted on a vehicle to give drive support to a driver, comprises a motion information acquiring unit 1, a vehicle information acquiring unit 2, an information storage 3, a controller 4, a presentation data acquiring unit 5 and an information presentation unit 6.

The motion information acquiring unit 1 is an information acquiring unit that acquires motion information of a driver of a vehicle. For example, it acquires information such as an image of the driver taken with an in-vehicle camera, which will enable the system to recognize driver's motion.

The vehicle information acquiring unit 2 is an information acquiring unit that acquires vehicle information about a state of the vehicle.

For example, via a CAN (Controller Area Network) communication, it acquires besides information about the turn signal operation, brake operation, accelerator operation, steering wheel operation, and gearshift operation, a vehicle speed pulse signal or acceleration information an acceleration sensor detects as the information about the vehicle speed. Thus, the vehicle information is information that indicates a running state decided by the driving behavior of the driver.

The information storage 3, which is a storage that stores operation data, programs and various databases, particularly stores support condition data which records drive support contents corresponding to a motion pattern of the driver to be provided with the drive support and a state of the vehicle (the individual vehicle states for a support condition and support cancellation condition). The information storage 3 is realized by a hard disk system the drive support system comprises, or by an SD card or a USB memory randomly readable by the controller 4, for example.

Incidentally, the support condition data can be constructed in an external data server.

In this case, the controller 4 gains access to the data server through a communication unit (not shown in the drawing) to appropriately read the support condition data.

The support condition data is data that is created from among actions other than the driving operation, which are performed naturally by the driver, by patterning a driver's motion that will bring about the drive support in a specific state of the vehicle, and by recording after relating the pattern to its drive support contents.

The support condition data with the ID number 001 shown in FIG. 2 is applied when the state of the vehicle is "less than 10 km/hour" (support condition), and the motion pattern of the driver to be provided with the drive support is "leaning forward and looking right or left".

For example, when the vehicle runs at a speed less than 10 km/hour, it is expected that the vehicle does not run almost and is stopped at an intersection or the like. In such a state of the vehicle, the foregoing action taken by the driver is supposed that the driver wants to check a blind spot in front of the vehicle while the vehicle is stopped at an intersection where visibility is bad. Accordingly, the support condition data with the ID number 001 records "front camera images (left and right)" as the drive support contents corresponding to them. Thus, when the driver takes the foregoing action in the foregoing state of the vehicle, the images of the front cameras are displayed on a HUD (head-up display) to enable the driver to check ahead by the images of the front cameras.

In addition, as shown in FIG. 2, the support condition data also records a vehicle state for canceling the drive support (support cancellation condition) besides the vehicle state which makes the condition for starting the drive support.

For example, the support condition data with the ID number 001 sets the state of the vehicle with a "speed not less than 10 km/hour" as the support cancellation condition. If the front camera images are displayed continuously even when the vehicle starts to run and the speed becomes "not less than 10 km/hour" after the front camera images are displayed as described above, this will rather hinder the driving. Accordingly, the support condition data records the vehicle state for canceling the drive support as well.

The support condition data with the ID number 002 shown in FIG. 2 is for the state of the vehicle when the vehicle speed is "less than 20 km/hour" (support condition), and the motion pattern of the driver to be provided with the drive support at this time is an action of "leaning forward and facing downward".

When vehicle is running at a speed less than 20 km/hour, it is supposed that the vehicle is running at reduced speed and that it travels along a narrow road, for example. If the driver takes the foregoing action in such a state of the vehicle, it is expected that the driver wants to check a downward direction to prevent the vehicle from getting stuck in a ditch or the like.

Accordingly, the support condition data with the ID number 002 records a "top view image" as the drive support contents corresponding to it. Thus, when the driver takes the foregoing action in the foregoing state of the vehicle, a top view image taken with an external camera is displayed on the HUD (head-up display) or the like to enable the driver to check the downward direction by the top view image.

Incidentally, if the top view image is displayed continuously even after the vehicle returns to its normal running, it will rather hinder the driving. Thus, the speed "not less than 20 km/hour" is recorded as the support cancellation condition.

The controller 4 is for controlling the operation of the internal components of the drive support system.

In particular, according to the support condition data, the controller 4 decides the drive support contents corresponding to the motion pattern matching the motion information of the driver acquired by the motion information acquiring unit 1 and to the state of the vehicle the vehicle information indicates which is acquired by the vehicle state acquiring unit 2.

In addition, it comprises a motion deciding unit 40, a vehicle state deciding unit 41 and a support data output unit 42 as its functional components.

The motion deciding unit 40 is a deciding unit that decides the motion pattern corresponding to the motion information of the driver, which is acquired by the motion information acquiring unit 1, in the support condition data.

For example, it carries out image analysis of a driver's image taken with the in-vehicle camera, which is acquired by the motion information acquiring unit 1, and decides whether the motion pattern obtained by the image analysis corresponds to the motion pattern in the support condition data.

The vehicle state deciding unit 41 is a deciding unit that decides the vehicle state (support condition and support cancellation condition) that corresponds to the state of the vehicle the vehicle information indicates, which is acquired by the vehicle information acquiring unit 2, in the support condition data.

For example, it detects the present speed of the vehicle from the vehicle speed pulse signal acquired by the vehicle information acquiring unit 2 as the vehicle information, and decides whether or not the speed falls within the speed range (support condition and support cancellation condition) of the vehicle in the support condition data.

Incidentally, the decision processing by the motion deciding unit 40 and vehicle state deciding unit 41 is made as follows, for example. First, when the vehicle state deciding unit 41 decides from among the support condition data the support condition data for the vehicle state corresponding to the vehicle information, it sends information about the support condition data it decides to the motion deciding unit 40 as a candidate to be executed. The motion deciding unit 40 selects the data about the motion pattern matching the motion information of the driver from the support condition data received from the vehicle state deciding unit 41 as the candidate to be executed, and decides the drive support contents.

The support data output unit 42 is a drive support executing unit that executes the drive support contents decided by the motion deciding unit 40 and vehicle state deciding unit 41.

For example, it supplies the information presentation unit 6 with the text information of a drive support message recorded in the support condition data. Thus, the information presentation unit 6 displays the drive support message or outputs the speech.

Alternatively, the support data output unit 42 can select from the information inside and outside the vehicle acquired by the presentation data acquiring unit 5 the information corresponding to the drive support contents decided, and can supply the information presentation unit 6 with the selected information without change or after applying prescribed processing. It is conceivable as the prescribed processing, for example, the processing of converting an image data taken with a front camera into a format that enables the HUD to display the image data when giving the drive support by displaying the front camera image on the HUD by the information presentation unit 6. This makes it possible to give the drive support in accordance with the actual conditions inside and outside the vehicle.

Furthermore, the support data output unit 42 can cause electrical equipment of the vehicle to be driven in accordance with the drive support contents. For example, when the driver wants to park the vehicle by pulling it over to the left edge in a parking space with a wall on the left side, it gives the drive support for closing the side mirror to prevent its left side mirror from touching the wall. More specifically, the support data output unit 42 instructs the vehicle control system to drive a switching mechanism of the side mirror so as to automatically close the side mirror as a function of the drive support.

The presentation data acquiring unit 5 is a data acquiring unit that acquires the information inside and outside the vehicle usable for the drive support. As the information inside and outside the vehicle, the following information items are conceivable, for example. Information outside the vehicle such as images (front camera images, top view images and the like) taken with cameras which are mounted on the vehicle and include the surroundings of the vehicle as their shooting ranges, and distance data up to an obstacle around the vehicle detected with a distance sensor; and information inside the vehicle such as an image on the rear seat side taken with an in-vehicle camera.

The information presentation unit 6 is an information presentation unit that presents the drive support contents decided by the controller 4. For example, when displaying the drive support information on an in-vehicle monitor, the information presentation unit 6 is realized as a display controller for controlling the information display of the in-vehicle monitor. In addition, when outputting sounds of the drive support information from an in-vehicle speaker, the information presentation unit 6 corresponds to a speech output controller that controls the output of sounds from the in-vehicle speaker.

Incidentally, the motion information acquiring unit 1, vehicle information acquiring unit 2, controller 4 (motion deciding unit 40, vehicle state deciding unit 41 and support data output unit 42), presentation data acquiring unit 5 and information presentation unit 6 are realized as a concrete means in which the microcomputer of the information processing system functioning as the drive support system executes programs relating to the specific processing in accordance with the present invention, thereby causing its hardware and software to cooperate.

Next, the operation will be described.

Figure 3:
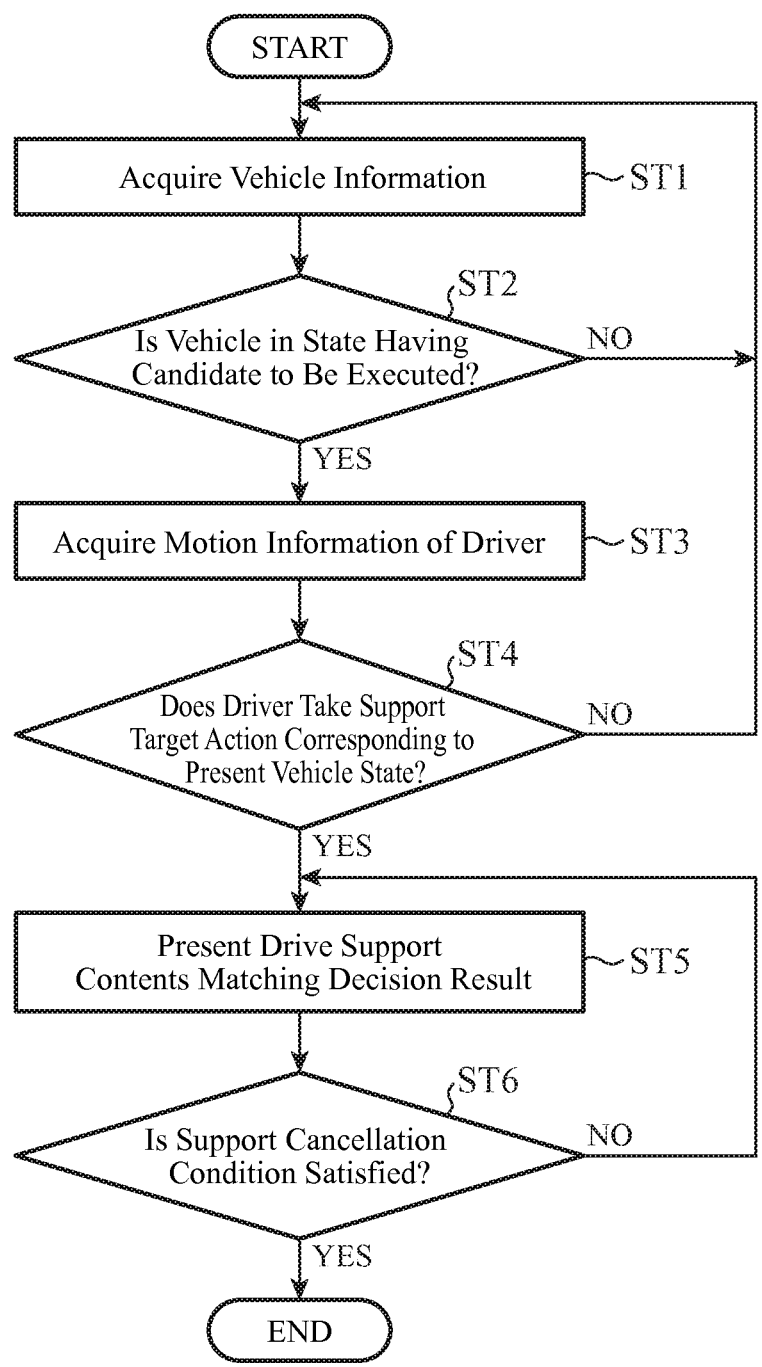
FIG. 3 is a flowchart showing the operation of the drive support system of the embodiment 1.

FIG. 3 is a flowchart showing the operation of the drive support system of the embodiment 1.

While the driver drives the vehicle, the vehicle information acquiring unit 2 acquires the vehicle information (step ST1). Here, the vehicle information is information indicating the running state of the vehicle.

Next, the vehicle state deciding unit 41 decides whether or not the support condition data stored in the information storage 3 includes the support condition data (candidate to be executed) corresponding to the vehicle state (running state) indicated by the vehicle information acquired by the vehicle information acquiring unit 2 (step ST2).

If the candidate to be executed is not included (NO at step ST2), the processing is returned to step ST1 to repeat the foregoing processing.

In contrast, if the data about the candidate to be executed is included (YES at step ST2), the vehicle state deciding unit 41 sends the support condition data about the candidate to be executed it decides from the support condition data to the motion deciding unit 40.

After that, the motion information acquiring unit 1 acquires the motion information of the driver (step ST3).

The motion deciding unit 40 decides from the motion information of the driver acquired by the motion information acquiring unit 1 whether the support target action (motion pattern of the driver to be provided with the drive support) of the support condition data, which is informed as the candidate to be executed by the vehicle state deciding unit 41, is taken or not (step ST4).

More specifically, the motion deciding unit 40 decides from among the support condition data of the candidate to be executed, which corresponds to the present vehicle state, the data about the motion pattern matching the motion information of the driver.

Incidentally, as for the decision, although the motion deciding unit 40 can make it as long as the vehicle state (running state) indicated by the vehicle information is applicable to the vehicle, a configuration is also possible which returns the processing to step ST1 when a prescribed decision period of time has elapsed even if the foregoing vehicle state continues.

Unless the driver takes the support target action (NO at step ST4), the processing is returned to step ST1 to repeat the foregoing processing.

If the driver takes the support target action (YES at step ST4), the motion deciding unit 40 sends to the support data output unit 42 the drive support contents in the support condition data about the motion pattern matching the motion information of the driver.

The support data output unit 42 supplies the information presentation unit 6 with the drive support contents informed by the motion deciding unit 40. Thus, the information presentation unit 6 presents the drive support contents decided by the controller 4 as described above (step ST5).

Incidentally, the support data output unit 42 can select the information corresponding to the drive support contents informed by the motion deciding unit 40 from the information inside and outside the vehicle acquired by the presentation data acquiring unit 5, and supplies the information presentation unit 6 with the information selected as it is or after applying prescribed processing to it.

Thus, the drive support contents are displayed on the in-vehicle monitor, or output from the in-vehicle speaker as output speech. In addition, as the drive support, it is also possible to drive and control the electrical equipment of the vehicle.

Next, according to the vehicle information the vehicle information acquiring unit 2 acquires, the vehicle state deciding unit 41 checks whether or not the state of the vehicle satisfies the support cancellation condition in the support condition data that executes the drive support (step ST6). More specifically, it confirms whether the present vehicle state (running state) corresponds to the vehicle state of the support cancellation condition.

Unless the present vehicle state satisfies the support cancellation condition (NO at step ST6), the processing is returned to step ST5 so that the information presentation unit 6 continues to present the drive support contents.

If the present vehicle state satisfies the support cancellation condition (YES at step ST6), the information presentation unit 6 terminates the presentation of the drive support contents.

Thus, the drive support system in accordance with the present invention uses as its execution standards of the drive support the actions (behavior) the driver takes naturally.

For example, when an obstacle outside the vehicle blocks the driver's field of vision in the driving direction of the vehicle, the driver tries to look at a region ahead blocked by the obstacle by specific action such as moving the face. On the contrary, if the obstacle has no influence on driving even if it blocks the driver's field of vision, the driver does not take any specific action as described above, and carries out normal driving. It is conceivable that such specific action is common to us all, and does not vary much between individuals.

Thus, to start the drive support, the present invention utilizes an action the driver will take when trying to look at a place outside the vehicle which is hard to see. For example, in the foregoing case, when the driver takes a specific action such as moving his or her face, displaying an image of a region ahead of an obstacle taken with an external camera enables drive support with appropriate contents at appropriate timing for the driver.

In addition, it is expected that a driver's action to be provided with the drive support can vary in accordance with driving skills. For example, when checking the sides of the vehicle, a driver with poor driving skills will turn his or her face much toward the sides, which can cause failure to look ahead properly. In this case, displaying a side image makes it possible to give the drive support contributing to safe driving.

On the other hand, since a driver with enough skills can check the sides using the side mirrors effectively, the driver little moves his or her face and does not require such drive support that displays a side image.

Thus, a configuration is also possible which gives drive support in accordance with the operating skills of the driver by using the support condition data recording the drive support contents corresponding to a motion pattern of a driver and a state of a vehicle In this case, according to the support condition data corresponding to the operating skills of the driver, the controller 4 decides the drive support contents corresponding to the motion pattern matching the motion information of the driver and to the state of the vehicle the vehicle information indicates.

For example, by setting the operating skills of the driver in the drive support system as the initial information, the drive support system gives the drive support by selecting the support condition data corresponding to the operating skills set. Thus, it can give the drive support in conformity with the operating skills of the driver.

As described above, according to the present embodiment 1, it comprises the motion information acquiring unit 1 that acquires the motion information of a driver of a vehicle; the vehicle information acquiring unit 2 that acquires the vehicle information about the state of the vehicle; the controller 4 that decides the drive support contents corresponding to the motion pattern matching the motion information of the driver and to the state of the vehicle the vehicle information indicates from the support condition data that records the drive support contents corresponding to the motion pattern of the driver to be provided with the drive support and the state of the vehicle; and the information presentation unit 6 that presents the drive support contents the controller 4 decides.

With the configuration, it can execute the drive support taking as an opportunity the specific action the driver performs naturally in a prescribed vehicle state. Accordingly, it can give the drive support with appropriate contents at appropriate timing for the driver.

In addition, according to the present embodiment 1, it comprises the presentation data acquiring unit 5 that acquires information inside and outside the vehicle to be used for the drive support, in which the controller 4 selects as drive support information, from among the information inside and outside the vehicle the presentation data acquiring unit acquires, the information corresponding to the drive support contents the controller 4 decides; and the information presentation unit 6 presents the information inside and outside the vehicle the controller 4 selects.

With the configuration, it can give the drive support in accordance with the actual conditions inside and outside the vehicle.

Furthermore, according to the present embodiment 1, the support condition data records the drive support contents corresponding to a motion pattern of the driver and a state of the vehicle in accordance with operating skills of the driver; and the controller decides, from among the support condition data corresponding to the operating skills of the driver, the drive support contents corresponding to the motion pattern matching the motion information of the driver and the state of the vehicle the vehicle information indicates. With the configuration, it can give the drive support corresponding to the operating skills of the driver.

Embodiment 2

Figure 4:
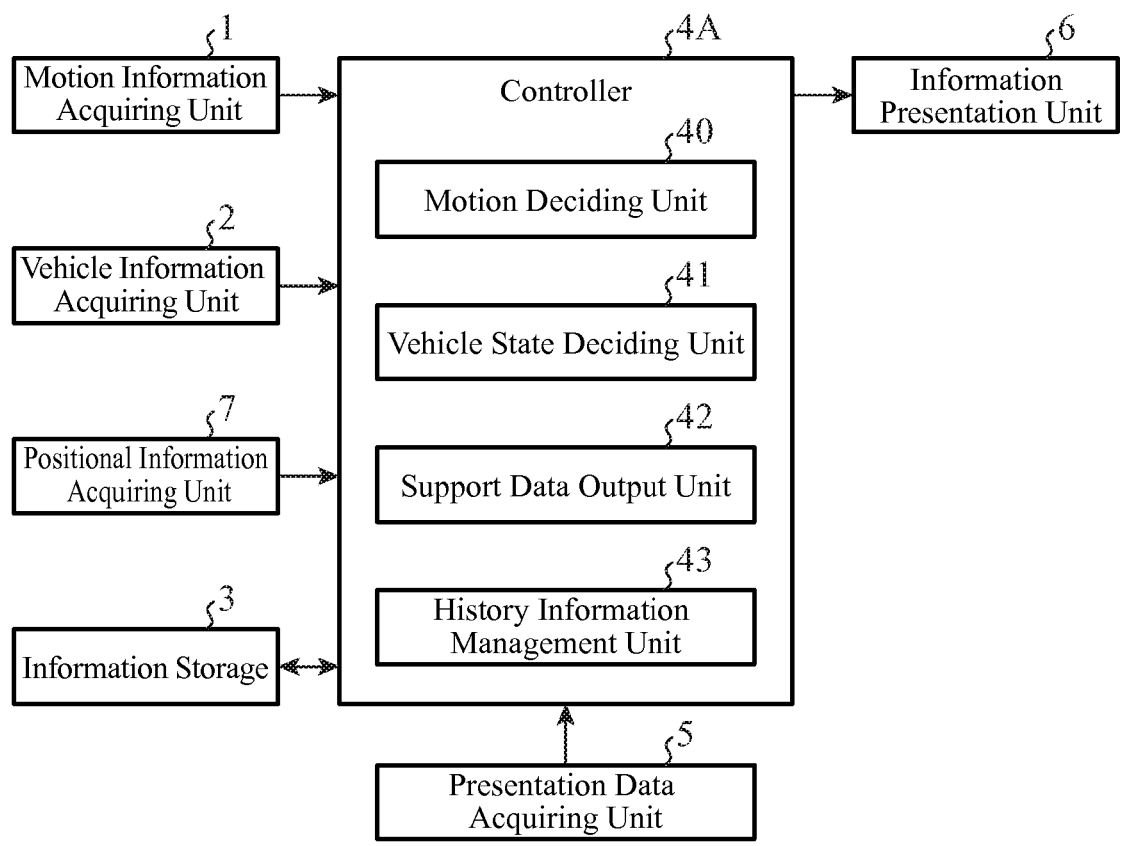
FIG. 4 is a block diagram showing a configuration of a drive support system of an embodiment 2 in accordance with the present invention.

FIG. 4 is a block diagram showing a configuration of a drive support system of an embodiment 2 in accordance with the present invention. The drive support system shown in FIG. 4 comprises a positional information acquiring unit 7 in addition to the configuration of the embodiment 1. Furthermore, instead of the controller 4, it has a controller 4A that comprises a history information management unit 43 added to the functional components of the controller 4.

The positional information acquiring unit 7 is an information acquiring unit that acquires the positional information of the vehicle. For example, it analyzes GPS signals received from GPS (Global Positioning System) satellites to acquire the positional information of the vehicle. Alternatively, it can acquire the positional information using the output of a gyroscope and vehicle speed pulses of a vehicle speed sensor.

The history information management unit 43 stores the place where the drive support was given and the drive support contents corresponding to the state of the vehicle at the time (the individual vehicle states corresponding to the support condition and the support cancellation condition) in the information storage 3 as the history information and manages them. For example, it stores the history information in the information storage 3 every time the drive support was given, and when the vehicle is approaching the place where the drive support was given in the past, and the same vehicle state (running state) takes place, the history information management unit 43 reads out the drive support contents in the history information.

Incidentally, the motion information acquiring unit 1, vehicle information acquiring unit 2, controller 4A (motion deciding unit 40, vehicle state deciding unit 41, support data output unit 42 and history information management unit 43), presentation data acquiring unit 5 and information presentation unit 6 are realized as a concrete means in which the microcomputer of the information processing system functioning as the drive support system executes programs relating to specific processing in accordance with the present invention, thereby causing its hardware and software to cooperate.

Next, the operation will be described.

Figure 5:
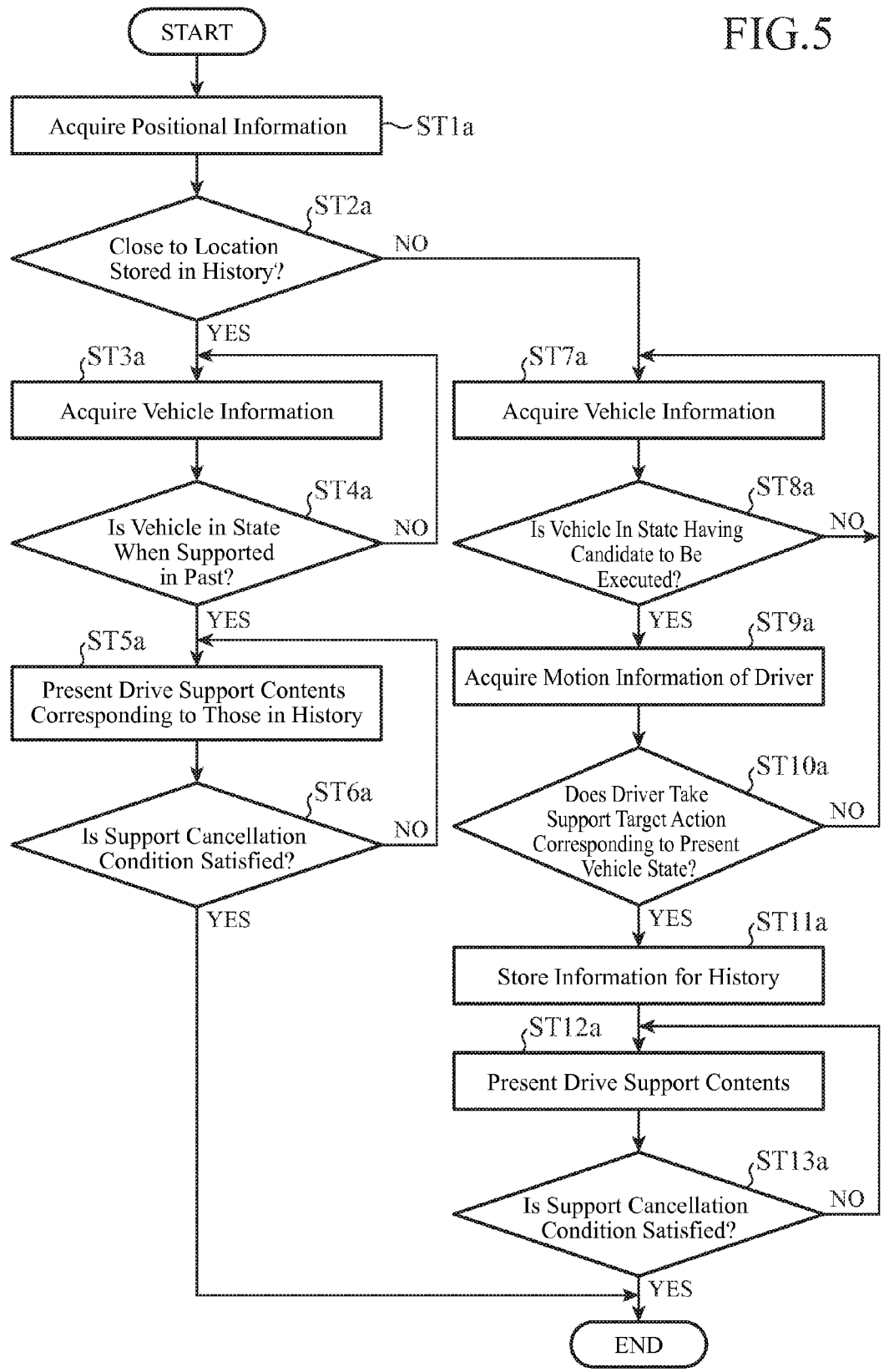
FIG. 5 is a flowchart showing the operation of the drive support system of the embodiment 2.

FIG. 5 is a flowchart showing the operation of the drive support system of the embodiment 2.

While the driver drives the vehicle, the positional information acquiring unit 7 continues to acquire the positional information of the vehicle (step ST1a). The positional information acquired by the positional information acquiring unit 7 is output to the history information management unit 43 of the controller 4A.

According to the positional information of the vehicle the positional information acquiring unit 7 acquires, the history information management unit 43 searches the history information of the information storage 3, and decides whether the present vehicle position is near the place where the drive support was given in the past or not (step ST2a). For example, it compares the present vehicle position with the position of the place where the drive support was given in the past, and checks whether the distance from the place where the drive support was given in the past to the present position of the vehicle is within a prescribed range or not.

If the vehicle position is close to the place stored in the history (YES at step ST2a), the vehicle information acquiring unit 2 acquires the vehicle information (step ST3a).

Next, the history information management unit 43 decides whether or not the vehicle state indicated by the vehicle information the vehicle information acquiring unit 2 acquires corresponds to the vehicle state (running state) in which the support was given in the past in the history information (history information including the place where the vehicle is approaching at the present) (step ST4a).

Incidentally, whether it corresponds to the vehicle state (running state) in which the support was given in the past or not can be decided by performing statistical processing such as quantification of past vehicle states, followed by averaging, and by using the processing result as a target to be compared.

Unless the present vehicle state is the vehicle state (running state) in which the support was given in the past (NO at step ST4a), the processing is returned to step ST3a to repeat the foregoing processing.

In contrast, when the present vehicle state corresponds to the vehicle state (running state) in which the support was given in the past (YES at step ST4a), the history information management unit 43 sends the drive support contents in the history information to the support data output unit 42.

The support data output unit 42 outputs the drive support contents sent from the history information management unit 43 to the information presentation unit 6. Thus, the information presentation unit 6 presents the drive support contents decided by the controller 4A as described above (step ST5a).

Thus, when the vehicle is approaching the place where the drive support of presenting a front camera image (left or right) was given once in the past, for example, even if the driver does not take a specific action (leaning forward to check the right direction), the front camera image (left or right) is automatically presented if the vehicle takes the state where the support was given in the past (less than 10 km/hour). More specifically, the drive support is given before the driver takes the specific action.

Next, according to the vehicle information the vehicle information acquiring unit 2 acquires, the vehicle state deciding unit 41 checks whether or not the state of the vehicle satisfies the support cancellation condition in the history information (step ST6a). Here, unless the present vehicle state satisfies the support cancellation condition (NO at step ST6a), the processing is returned to step ST5a so as to cause the information presentation unit 6 to continue presenting the drive support contents.

When the present vehicle state satisfies the support cancellation condition (YES at step ST6a), the information presentation unit 6 terminates presenting the drive support contents.

On the other hand, unless the vehicle position is close to the place stored in the history (NO at step ST2a), the vehicle information acquiring unit 2 acquires the vehicle information (step ST7a).

The vehicle state deciding unit 41 decides whether or not the support condition data stored in the information storage 3 includes the support condition data (candidate to be executed) corresponding to the vehicle state (running state) indicated by the vehicle information the vehicle information acquiring unit 2 acquires (step ST8a).

Unless the candidate to be executed is present (NO at step ST8a), the processing is returned to step ST7a to repeat the foregoing processing.

In contrast, if the data about the candidate to be executed is present (YES at step ST8a), the vehicle state deciding unit 41 sends the support condition data about the candidate to be executed it decides to the motion deciding unit 40.

After that, the motion information acquiring unit 1 acquires the motion information of the driver (step ST9a).

According to the motion information of the driver acquired by the motion information acquiring unit 1, the motion deciding unit 40 decides whether or not the driver takes a support target action of the support condition data (motion pattern of the driver to be provided with the drive support), which is sent from the vehicle state deciding unit 41 as the candidate to be executed (step ST10a).

Unless the driver takes the support target action (NO at step ST10a), the processing is returned to step ST7a to repeat the foregoing processing.

It the driver takes the support target action (YES at step ST10a), the motion deciding unit 40 sends to the support data output unit 42 the drive support contents in the support condition data about the motion pattern matching the motion information of the driver.

After that, the history information management unit 43 interrelates the present vehicle position, the vehicle state the vehicle information indicates (the individual vehicle states corresponding to the support condition and the support cancellation condition in the support condition data decided as the target to be executed), and the drive support contents to be executed, and stores them in the information storage 3 as the history information (step ST11a).

The support data output unit 42 outputs the drive support contents informed by the motion deciding unit 40 to the information presentation unit 6. Thus, the information presentation unit 6 presents the drive support contents the controller 4 decides as described above (step ST12a).

Next, according to the vehicle information the vehicle information acquiring unit 2 acquires, the vehicle state deciding unit 41 checks whether the state of the vehicle satisfies the support cancellation condition in the support condition data used for giving the drive support (step ST13a).

Unless the present vehicle state satisfies the support cancellation condition (NO at step ST13a), the processing is returned to step ST12a so as to cause the information presentation unit 6 to continue presenting the drive support contents.

If the present vehicle state satisfies the support cancellation condition (YES at step ST13a), the information presentation unit 6 terminates presenting the drive support contents.

As described above, according to the present embodiment 2, it comprises the information storage 3 that stores as the history information the location where the drive support was given and the drive support contents corresponding to the state of the vehicle at the time; and the positional information acquiring unit 7 that acquires positional information of the vehicle, wherein the controller 4A selects the drive support contents in the history information when the controller 4A decides from the positional information of the vehicle the positional information acquiring unit 7 acquires that the vehicle is approaching the location where the drive support in the history information was performed, and when the state of the vehicle the vehicle information indicates matches the state of the vehicle in the history information; and the information presentation unit 6 presents the drive support contents the controller 4A selects.

With the configuration, when the vehicle is approaching the location where the driver was given the support in the past, and when the present vehicle is in the state that gives the support in the past, the present embodiment 2 can give the drive support before the driver takes a specific action. Thus, it can give the drive support with the appropriate contents at the appropriate timing for the driver.

Embodiment 3

Figure 6:
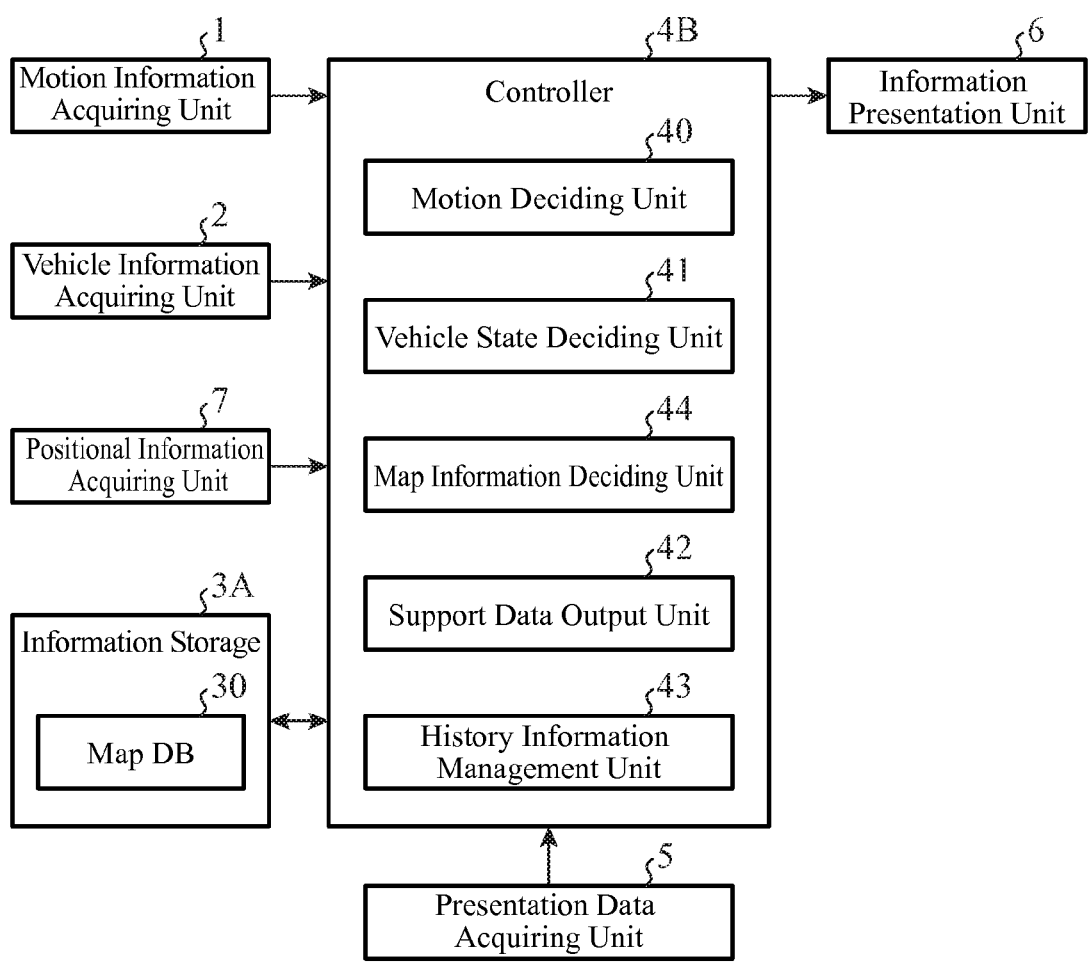
FIG. 6 is a block diagram showing a configuration of a drive support system of an embodiment 3 in accordance with the present invention.

FIG. 6 is a block diagram showing a configuration of a drive support system of an embodiment 3 in accordance with the present invention. The drive support system shown in FIG. 6, which has basically the same configuration as the embodiment 2, comprises instead of the information storage 3 an information storage 3A including a map DB (database) 30 in addition to the stored contents shown in the embodiments 1 and 2, and further comprises instead of the controller 4A a controller 4B including a map information deciding unit 44 as an additional functional component.

The map DB 30 is a database that records map information including facility information (such as latitude and longitude of a facility, its classification and parking lot information) and road information (such as road data specifying the width of a road and an intersection). Although FIG. 6 shows an example which stores the map DB 30 in the information storage 3A, it can be downloaded from an external map data server.

The map information deciding unit 44 is a deciding unit that decides the location where the vehicle is present according to the map information acquired from the map DB 30 and the positional information of the vehicle acquired by the positional information acquiring unit 7.

In addition, the information storage 3A stores the map information about a location where the drive support is to be given (such as its latitude and longitude, a facility classification, a road type such as an intersection, and a feature type such as a stop line), and support condition data recording the drive support contents corresponding to a motion pattern of a driver and a state of the vehicle.

Incidentally, the motion information acquiring unit 1, vehicle information acquiring unit 2, controller 4B (motion deciding unit 40, vehicle state deciding unit 41, support data output unit 42, history information management unit 43 and map information deciding unit 44), presentation data acquiring unit 5, information presentation unit 6 and positional information acquiring unit 7 are realized as a concrete means in which the microcomputer of the information processing system functioning as the drive support system executes programs relating to specific processing in accordance with the present invention, thereby causing its hardware and software to cooperate.

Next, the operation will be described.

First, the map information deciding unit 44 decides the location where the vehicle is present from the map information acquired from the map DB 30 and the positional information of the vehicle acquired by the positional information acquiring unit 7.

More specifically, it decides from the support condition data stored in the information storage 3A the support condition data including the location at which the vehicle is present and the drive support is to be given as a candidate to be executed. Incidentally, as a location where the drive support is to be given, for example, an intersection, a narrow road and the like are conceivable.

The map information deciding unit 44 sends the support condition data about the candidate to be executed decided from among the support condition data to the vehicle state deciding unit 41.

The vehicle state deciding unit 41 decides whether or not the support condition data sent from the map information deciding unit 44 as the candidate to be executed includes the support condition data corresponding to the vehicle state (running state) indicated by the vehicle information acquired by the vehicle information acquiring unit 2.

When the data about the candidate to be executed is present, the vehicle state deciding unit 41 sends the support condition data decided to the motion deciding unit 40 as the candidate to be executed.

According to the motion information of the driver acquired by the motion information acquiring unit 1, the motion deciding unit 40 decides whether the driver has taken or not the support target action (motion pattern of the driver to be provided with the drive support) of the support condition data sent from the vehicle state deciding unit 41 as the candidate to be executed.

If the driver has taken the support target action, the motion deciding unit 40 sends the drive support contents in the support condition data about the motion pattern matching the motion information of the driver to the support data output unit 42.

At this time, as in the embodiment 2, the history information management unit 43 can store in the information storage 3 the present vehicle position (map information), the vehicle state the vehicle information indicates (the individual vehicle states corresponding to the support condition and the support cancellation condition in the support condition data decided as the target to be executed) and the drive support contents after interrelating them as the history information.

The support data output unit 42 outputs the drive support contents informed by the motion deciding unit 40 to the information presentation unit 6. Thus, the information presentation unit 6 presents the drive support contents decided by the controller 4 as described above.

After that, according to the vehicle information the vehicle information acquiring unit 2 acquires, the vehicle state deciding unit 41 checks whether the state of the vehicle satisfies the support cancellation condition in the support condition data that executes the drive support. At this time, if the present vehicle state satisfies the support cancellation condition, the information presentation unit 6 terminates presenting the drive support contents.

In this way, the present embodiment 3 can improve the accuracy of the driver's decision of the location where the drive support is to be given.

In addition, if the motion information of the driver acquired by the motion information acquiring unit 1 matches the motion pattern requiring the drive support, the controller 4B can present the drive support contents requested by the driver. Incidentally, the term "the motion pattern requesting the drive support" refers to a specific action of the driver other than the driving operation, which is set in the motion deciding unit 40 in advance. For example, an action is conceivable which moves the driver's face or line of sight to the left and to the right a plurality of times.

When the motion deciding unit 40 decides that the motion information of the driver is a motion pattern requesting the drive support, it decides from the support condition data the drive support contents the driver requests.

In this case, the motion deciding unit 40 instructs the information presentation unit 6 to inquire about the drive support contents the driver requests. For example, it causes the information presentation unit 6 to output speech such as "Are you looking for something?", and waits for receiving an answer from the driver by an input unit not shown in the drawing.

When the driver requests to search for surrounding facilities, the map information deciding unit 44 retrieves surrounding facilities from the map DB 30 according to the positional information of the vehicle acquired by the positional information acquiring unit 7. The facility information about the surrounding facilities obtained as a retrieval result is output to the information presentation unit 6 via the support data output unit 42. Thus, the information presentation unit 6 presents the facility information about the surrounding facilities.

This makes it possible to give the drive support the driver desires.

In addition, according to the motion information of the driver acquired by the motion information acquiring unit 1, the motion deciding unit 40 can decide the drive support contents the driver requests.

In this case, the drive support contents are set in the motion deciding unit 40 in advance after relating them to specific actions of the driver other than the driving operation.

Here, an example will be described which relates the action of the driver of pointing to the outside to the drive support of retrieving and presenting facility information about facilities in the direction indicated by the driver.

According to the motion information of the driver the motion information acquiring unit 1 acquires, the motion deciding unit 40 decides the direction the driver indicates. The direction indicated is sent to the map information deciding unit 44.

According to the map information acquired from the map DB 30 and the positional information of the vehicle the positional information acquiring unit 7 acquires, the map information deciding unit 44 retrieves the facility information about facilities in the direction the driver indicates. Thus, the information presentation unit 6 presents the facility information retrieved by the map information deciding unit 44. For example, it makes a list of the facility information and displays it.

In this way, it can also give the drive support the driver desires.

As described above, according to the present embodiment 3, it comprises the positional information acquiring unit 7 that acquires positional information of the vehicle, wherein the controller 4B decides the location where the vehicle is present from the map information acquired from the map DB 30 and from the positional information of the vehicle the positional information acquiring unit 7 acquires, and wherein according to the support condition data recording the drive support contents which correspond to the map information on the location where the drive support is to be given, the motion pattern of the driver, and the state of the vehicle, the controller decides the drive support contents that correspond to the location decided, the motion pattern matching the motion information of the driver, and the state of the vehicle the vehicle information indicates.

With the configuration, it can improve the accuracy of the decision of the location where the driver is to be given the drive support.

In addition, according to the present embodiment 3, when the motion information of the driver the motion information acquiring unit 1 acquires is associated with a motion pattern requesting the drive support, the controller 4B presents the drive support contents requested by the driver. With the configuration, it can give the drive support the driver desires.

Furthermore, according to the present embodiment 3, the controller 4B decides the drive support contents the driver requests from the motion information the motion information acquiring unit 1 acquires. In this way, it can give the drive support the driver desires without any operational input of the drive support contents.

Furthermore, according to the present embodiment 3, it comprises the positional information acquiring unit 7 that acquires positional information of the vehicle, wherein the controller 4B decides the direction the driver indicates from the motion information of the driver the motion information acquiring unit 1 acquires, and retrieves facility information about a facility existing in the direction the driver indicates from the map information acquired from the map DB 30 and the positional information of the vehicle the positional information acquiring unit 7 acquires; and the information presentation unit 6 presents the facility information the controller 4B retrieves.

With the configuration, it can give the drive support the driver desires.

Embodiment 4

Figure 7:
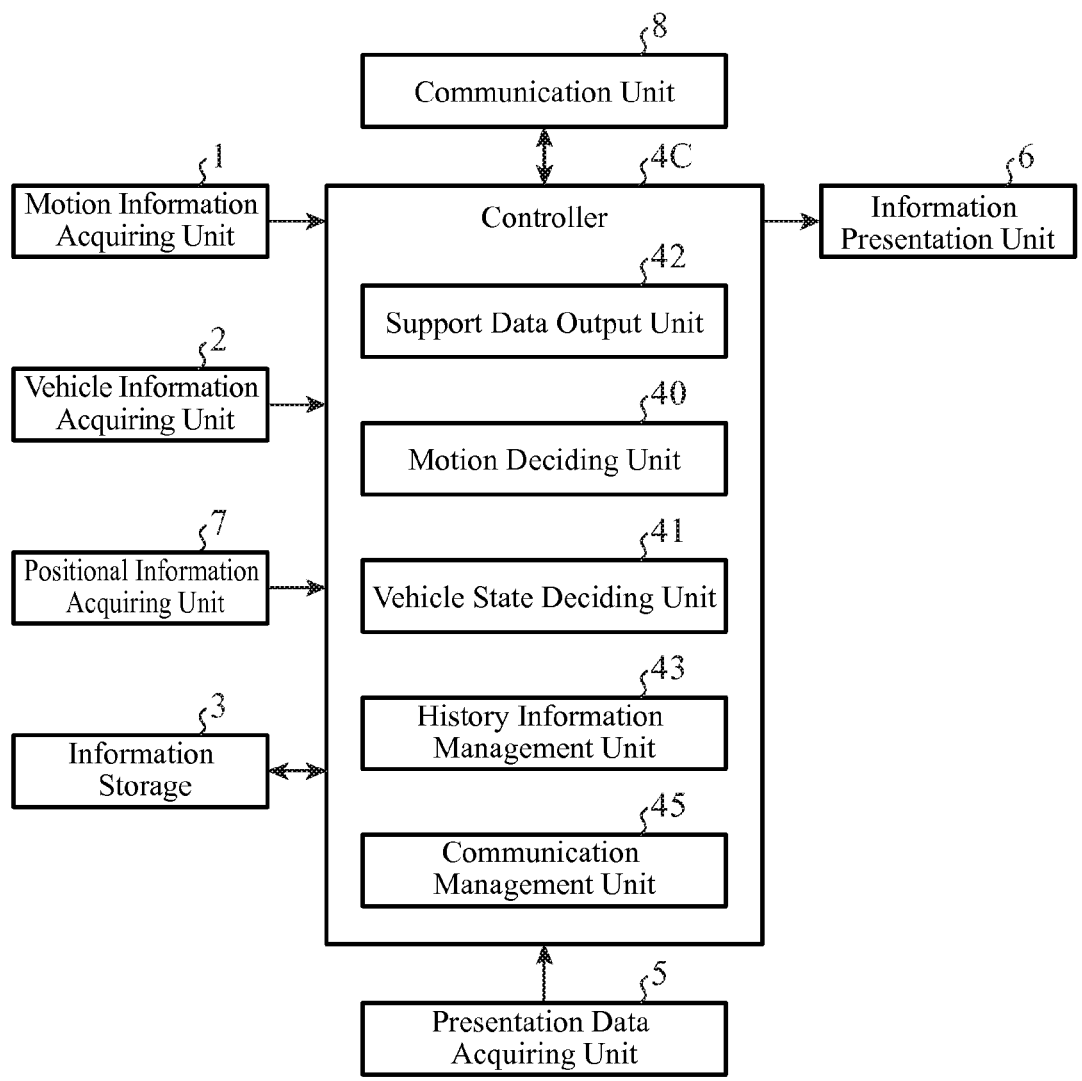
FIG. 7 is a block diagram showing a configuration of a drive support system of an embodiment 4 in accordance with the present invention.

FIG. 7 is a block diagram showing a configuration of a drive support system of an embodiment 4 in accordance with the present invention.

The drive support system shown in FIG. 7 comprises a communication unit 8 added to the configuration of the embodiment 2, and further comprises instead of the controller 4A a controller 4C including a communication management unit 45 as an additional functional component. The communication unit 8, which is a communication unit for carrying out communication with external equipment, is realized by a hardware module for carrying out communication with the external equipment via a communication network.

In addition, as for the external equipment, it is assumed that it is a data server connected to the communication network, for example, and that it stores the location where the drive support was given and the drive support contents corresponding to the state of the vehicle at the time as the history information.

The communication management unit 45 is a management unit that manages the information exchanged between the communication unit 8 and the external equipment. For example, it outputs the history information received from the external equipment by the communication unit 8 to the vehicle state deciding unit 41. In addition, by supplying the communication unit 8 with the positional information of the vehicle, the communication management unit 45 requests the external equipment to send the history information corresponding to the vehicle position via the communication unit 8.

Incidentally, the motion information acquiring unit 1, vehicle information acquiring unit 2, controller 4C (motion deciding unit 40, vehicle state deciding unit 41, support data output unit 42, history information management unit 43 and communication management unit 45), presentation data acquiring unit 5, information presentation unit 6 and positional information acquiring unit 7 are realized as a concrete means in which the microcomputer of the information processing system functioning as the drive support system executes programs relating to the specific processing in accordance with the present invention, thereby causing its hardware and software to cooperate.

Next, the operation will be described.

First, the communication management unit 45 sends a history information request which includes the present positional information and the positional information sent to the external equipment immediately before, which are contained in the positional information of the vehicle acquired by the positional information acquiring unit 7, to the external equipment via the communication unit 8.

Receiving the history information request from the drive support system, according to the present positional information of the vehicle and the positional information of the vehicle received immediately before, the external equipment selects, from the history information it manages, the history information which corresponds to the surroundings of the present position of the vehicle and which contains a location not sent previously (the location where the drive support is to be given) and the drive support contents, and returns it to the request side.

The communication management unit 45 updates the contents of the support condition data stored in the information storage 3 using the history information received from the external equipment via the communication unit 8.

Incidentally, the support condition data update processing by the communication unit 8 and communication management unit 45 is executed regularly at prescribed time intervals.

In this way, the driver who has not undergone the drive support actually can be provided with the drive support according to the drive support information which other drivers have experienced and are stored in the external equipment. Thus, as for a location where the driver has never been before, but many other drivers have required the drive support, the driver can receive the drive support with the same contents as those other drivers have received. More specifically, before the driver takes a specific action, the present embodiment 4 can prepare the drive support in advance at the place and with the contents other drivers have undergone the drive support.

In addition, it can give the drive support by appropriately receiving the history information from the external equipment.

For example, the history information management unit 43 accesses the external equipment via the communication unit 8 to retrieve the history information corresponding to the positional information of the vehicle acquired by the positional information acquiring unit 7, and decides whether the present vehicle position is close to a place where the drive support was given in the past or not.

For example, it compares the present vehicle position with the position of the place where the drive support was given in the past, and checks whether the distance from the place where the drive support was given in the past to the present position of the vehicle is within a prescribed range or not.

If the vehicle position is close to the place stored in the history, the history information management unit 43 decides whether or not the vehicle state indicated by the vehicle information the vehicle information acquiring unit 2 acquires corresponds to the vehicle state (running state) in the history information (history information including the place the vehicle is approaching at the present) when the drive support was given in the past. If the present vehicle state corresponds to the vehicle state (running state) when the support was given in the past, the history information management unit 43 sends the drive support contents in the history information to the support data output unit 42.

The support data output unit 42 outputs the drive support contents received from the history information management unit 43 to the information presentation unit 6. Thus, the information presentation unit 6 presents the drive support contents decided by the controller 4C as described above. In this way, the drive support is given before the driver takes a specific action.

As described above, according to the present embodiment 4, it further comprises the communication unit 8 that carries out communication with external equipment that stores as the history information a location where the drive support was given and the drive support contents corresponding to the state of the vehicle at the time, wherein when the controller 4C decides from the positional information of the vehicle the positional information acquiring unit 7 acquires that the vehicle is approaching the location where the drive support was given and which is recorded in the history information the communication unit 8 receives from the external equipment, and when the state of the vehicle the vehicle information indicates corresponds to the state of the vehicle in the history information, the controller 4C selects the drive support contents in the history information, and the information presentation unit 6 presents the drive support contents the controller 4C selects.

With the configuration, it enables the driver to receive the drive support at a place where the driver has never been before with the same contents as those many other drivers have required the support.

Embodiment 5

Figure 8:
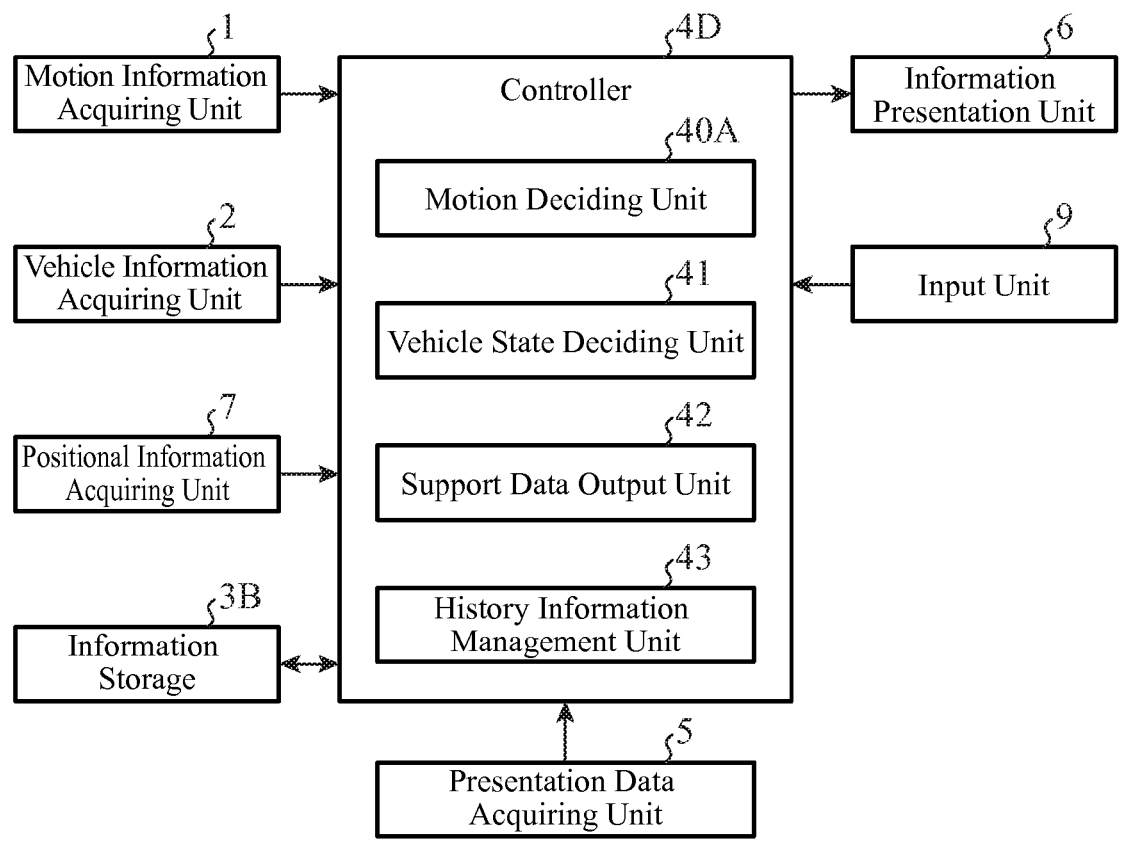
FIG. 8 is a block diagram showing a configuration of a drive support system of an embodiment 5 in accordance with the present invention.

FIG. 8 is a block diagram showing a configuration of a drive support system of an embodiment 5 in accordance with the present invention.

The drive support system shown in FIG. 8, which has basically the same configuration as the embodiment 2, comprises an input unit 9, and comprises instead of the information storage 3 an information storage 3B that stores the support condition data or history information which associates a motion pattern of the driver to be given the drive support with the magnitude of the motion, and further comprises instead of the controller 4A a controller 4D that includes a motion deciding unit 40A for deciding a motion pattern of the driver using the magnitude of the motion as a reference.

As shown in FIG. 9, the information storage 3B stores the support condition data which records the drive support contents corresponding to the motion pattern of the driver to be provided with the drive support, the magnitude of the motion, and the state of the vehicle (the individual vehicle states of the support condition and support cancellation condition). Here, the magnitude of the motion is an indicator value resulting from the quantification of the amount of the change of the driver when the driver takes a support target action (such as the amount of the change of a featuring place such as the driver's face, arms and the like) with respect to the time of the change.

Using the magnitude of the motion as a decision reference can increase the probability of making a right decision that a support target action taken by the driver with intention is an action to which the drive support is to be given, and that a support target action taken by the driver by chance is not an action to which the drive support is to be given.

Thus, it can improve the reliability of the decision of a start of the drive support.

In addition, a configuration is also possible in which a user can appropriately set the magnitude of a motion in the support condition data of the information storage 3B through the input unit 9.

For example, when the driver wants to make it easier to receive the drive support, he or she sets the magnitude of the motion used as the decision reference at a smaller value in the support condition data, but when the driver does not want to receive the drive support too often, he or she sets the magnitude of the motion at a larger value. Thus, the magnitude of the motion of the support condition data functions as a decision reference (threshold) for starting the drive support.

Generally, the magnitude of the motion of the support target action increases with a reduction in visibility of the location where the vehicle is present and with an increase of the driver's uneasiness.

Accordingly, each driver can alter the threshold for deciding a start of the drive support in accordance with the driver's operating skills by setting the magnitude of a motion in the support condition data through the input unit 9, for example.

The motion deciding unit 40A compares the magnitude of the motion of the driver acquired by the motion information acquiring unit 1 with the magnitude of a motion in the support condition data stored in the information storage 3B, and decides from the compared result whether the driver's motion corresponds to the motion pattern or not.

For example, if the magnitude of the motion of the support target action by the driver acquired by the motion information acquiring unit 1 exceeds the magnitude of the motion (indicator value) of the motion pattern corresponding to the support condition data stored in the information storage 3B, the motion deciding unit 40A decides that the driver's motion is the motion pattern of the support target action.

The input unit 9 is an input unit to which information is input from outside.

For example, it is comprised of hardware for input such as operation keys, operation buttons, or a touch panel, and of software for supplying the controller 4D with a signal input through the hardware. Alternatively, it can be an input unit for inputting information by voice recognition.

Incidentally, the motion information acquiring unit 1, vehicle information acquiring unit 2, controller 4D (motion deciding unit 40A, vehicle state deciding unit 41, support data output unit 42 and history information management unit 43), presentation data acquiring unit 5, information presentation unit 6 and positional information acquiring unit 7 are realized as a concrete means in which the microcomputer of the information processing system functioning as the drive support system executes programs relating to the specific processing in accordance with the present invention, thereby causing its hardware and software to cooperate.

Next, the operation will be described.

Figure 10:
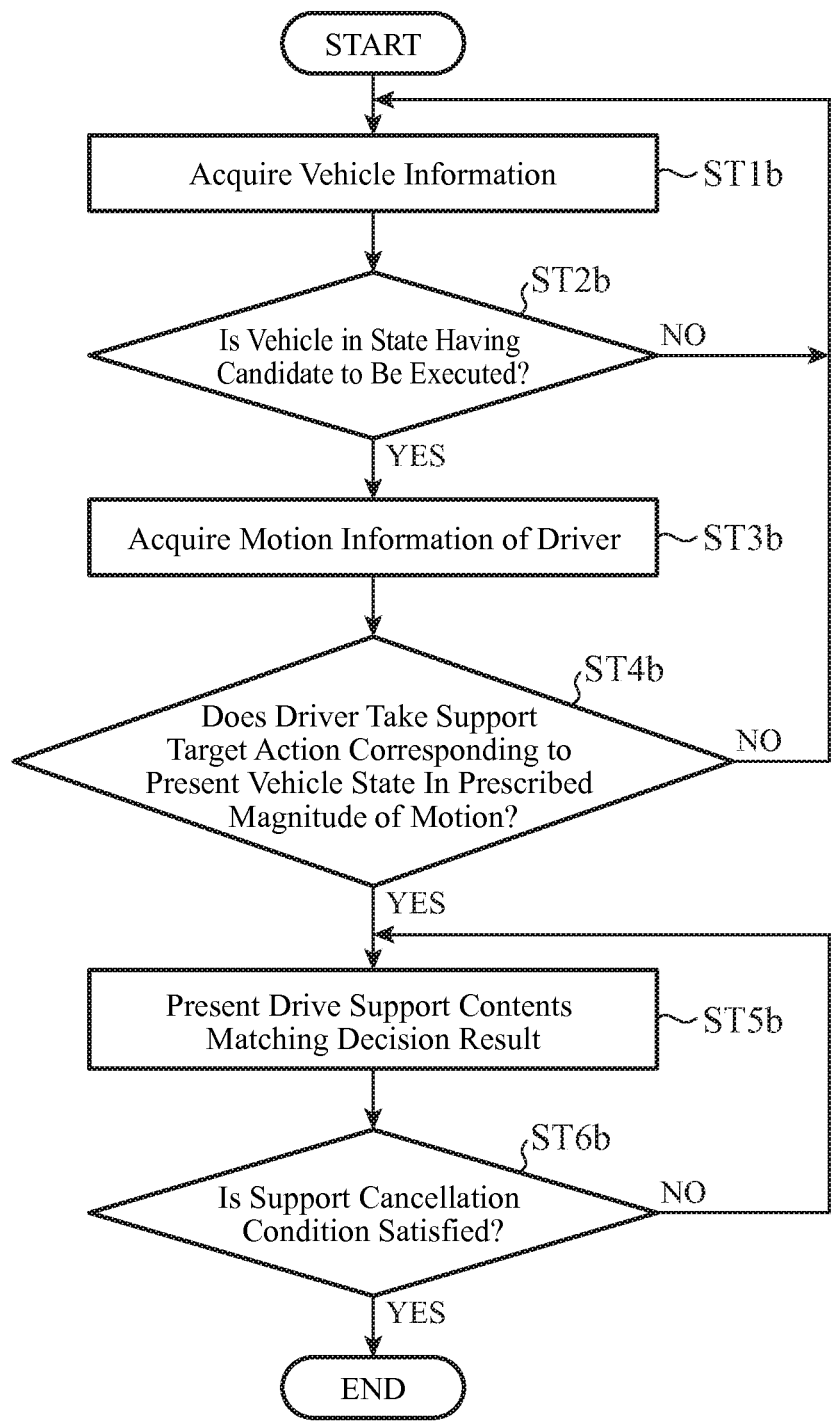
FIG. 10 is a flowchart showing the operation of the drive support system of the embodiment 5.

FIG. 10 is a flowchart showing the operation of the drive support system of the embodiment 5.

In FIG. 10, since the processing from step ST1b to step ST3b is the same as the processing from step ST1 to step ST3 in FIG. 3, its description will be omitted.

After the processing at step ST3b has been completed, and when the motion deciding unit 40A decides from the motion information of the driver acquired by the motion information acquiring unit 1 that the driver performs a support target action in the support condition data, it analyzes the motion information of the driver and makes an indicator from the magnitude of the motion.

For example, it calculates the indicator value indicating the magnitude of the motion from the amount of the change of a featuring part such as the driver's face or arms and from the time of the change.

Next, the motion deciding unit 40A compares the magnitude of the motion calculated from the motion information of the driver as described above with the magnitude of the motion recorded in the support condition data, and decides from the compared result whether the driver performs the support target action corresponding to the present vehicle state with the prescribed magnitude or not (step ST4b). Here, it decides whether the driver takes the support target action with the magnitude greater than the magnitude of the motion in the support condition data.

If it is not greater than the magnitude of the motion in the support condition data, which means that the driver does not take the support target action with the prescribed magnitude (NO at step ST4b), the processing is returned to step ST1b to repeat the processing from step ST1b to step ST4b.

In contrast, if it is greater than the magnitude of the motion in the support condition data, which means that the driver takes the support target action with the prescribed magnitude (YES at step ST4b), the motion deciding unit 40A decides that the driver takes the support target action, and sends to the support data output unit 42 the drive support contents recorded in the support condition data including the support target action.

The support data output unit 42 outputs the drive support contents sent from the motion deciding unit 40A to the information presentation unit 6. Thus, the information presentation unit 6 presents the drive support contents decided by the controller 4D as described above (step ST5b).

The processing at the following step ST6b is the same as the processing at step ST6 of FIG. 3.

In addition, as shown in FIG. 11, for example, the information storage 3B can store the history information containing a motion pattern of the driver to be provided with the drive support, and the magnitude of the motion.

In this case, the history information management unit 43 compares the magnitude of a motion stored in the history information with the magnitude of the motion which the driver set in advance for giving the drive support, and sends the drive support contents recorded in the history information to the support data output unit 42 in accordance with the compared result.

For example, when the history information management unit 43 decides from the positional information of the vehicle the positional information acquiring unit 7 acquires that the vehicle is approaching the place where the drive support in the history information was given, and when the state of the vehicle the vehicle information indicates matches the state of the vehicle in the history information, the history information management unit 43 compares the magnitude of the motion in the history information with the magnitude of the motion for giving the drive support, which the driver set in advance via the input unit 9. At this time, if the magnitude of the motion taken in the past in the history information is greater than the magnitude of the motion set in advance for giving the drive support, the history information management unit 43 sends the drive support contents in the history information to the support data output unit 42 regardless of the driver's motion. This makes it possible to give the drive support in advance before the driver takes a specific action.

Incidentally, a configuration is also possible in which the controller 4D stores the motion pattern, the state of the vehicle, the vehicle position, and the drive support contents corresponding to them in the information storage 3B as the history information regardless of the magnitude of the motion of the driver, when the motion information of the driver corresponds to the support target action (motion pattern of the driver to be provided with the drive support) and the state of the vehicle the vehicle information indicates corresponds to the state of the vehicle to be provided with the drive support.

For example, even when the driver set the magnitude of the motion in advance in such a manner that the drive support is given only at a place where a large motion (support target action) was taken in the past, there are some cases, depending on a real driving situation, where the driver wants to display the drive support information about a place where he or she took a small motion in the past. In this case, storing the history information in accordance with the magnitude of the motion of the driver will bring about the reduction in the data to be stored as the history information, and thus can reduce the reliability of the decision of the drive support.

For this reason, regardless of the magnitude of the motion of the driver, that is, even if the drive support is not given, when the driver takes a support target action and when the vehicle state corresponds to a vehicle state in the support condition data, the controller stores the data including the present position and the like as the history information. This will make it possible to increase the history information and to improve the reliability of the decision of the drive support, thereby being able to make preparations in advance for the support at a lot of places.

In addition, a configuration is also possible in which the external equipment described in embodiment 4 stores the history information including a motion pattern of the driver to be provided with the drive support together with the magnitude of the motion.

In this case, the history information management unit 43 compares the magnitude of the motion retained in the history information with the magnitude of the motion for giving the drive support, which the driver has set in advance, and according to the compared result, it sends the drive support contents recorded in the history information to the support data output unit 42.

For example, when the history information management unit 43 decides from the positional information of the vehicle the positional information acquiring unit 7 acquires that the vehicle is approaching the place where the drive support in the history information, which the communication unit (such as the communication unit 8) receives from external equipment, and when the state of the vehicle the vehicle information indicates matches the state of the vehicle in the history information, the history information management unit 43 compares the magnitude of the motion in the history information with the magnitude of the motion for giving the drive support, which the driver set in advance via the input unit 9. At this time, if the magnitude of the motion taken in the past in the history information is greater than the magnitude of the motion set in advance for giving the drive support, the history information management unit 43 sends the drive support contents in the history information to the support data output unit 42 regardless of the driver's motion. This also makes it possible to give the drive support in advance before the driver takes a specific action, while improving the reliability of the decision whether the driver takes the support target action or not.

In the foregoing case, a configuration is also possible in which the controller 4D sends the motion pattern, the state of the vehicle, the vehicle position, and the drive support contents corresponding to them to the external equipment via the communication unit 8 to be stored as the history information regardless of the magnitude of the motion of the driver, when the motion information of the driver corresponds to the support target action (motion pattern of the driver to be provided with the drive support) and the state of the vehicle the vehicle information indicates corresponds to the state of the vehicle to be provided with the drive support. This also makes it possible to increase the volume of the history information and to improve the reliability of the decision of the drive support.

As described above, according to the present embodiment 5, the controller 4D compares the magnitude of the motion recorded in the support condition data with the magnitude of the motion of the driver acquired by the motion information acquiring unit 1, and decides from the compared result whether the driver's motion corresponds to the motion pattern or not.

In this way, when the driver takes a support target action with intention, the probability of starting the drive support increases, which can improve the reliability of the decision of starting the drive support.

In addition, according to the present embodiment 5, it comprises the input unit 9 that receives information from outside, and the controller 4D receives from the input unit the magnitude of the motion of a motion pattern of the driver to be provided with the drive support, and records the magnitude of the motion in the support condition data. Thus, it can alter the threshold of deciding a start of the drive support in accordance with the operating skills of each driver, for example.

Furthermore, according to the present embodiment 5, it comprises the input unit 9 that receives information from outside, wherein the information storage 3B stores the history information including a motion pattern of the driver to be provided with the drive support together with the magnitude of the motion; and wherein when the controller 4D decides from the positional information of the vehicle the positional information acquiring unit 7 acquires that the vehicle is approaching the location where the drive support in the history information was given, and when the state of the vehicle the vehicle information indicates corresponds to the state of the vehicle in the history information, the controller 4D compares the magnitude of the motion in the history information with the magnitude of the motion set in advance via the input unit 9 for giving the drive support, and when the magnitude of the motion in the history information satisfies the magnitude of the motion set in advance for giving the drive support, the controller 4D presents the drive support contents in the history information regardless of the motion of the driver. With the configuration, it can give the drive support in advance before the driver takes a specific action, while improving the reliability of the decision whether the driver takes the motion pattern (support target action) or not.

Furthermore, according to the present embodiment 5, when the motion information of the driver matches the motion pattern of the driver to be provided with the drive support, and when the state of the vehicle the vehicle information indicates corresponds to the state of the vehicle to be provided with the drive support, the controller 4D stores the motion pattern, the state of the vehicle, the vehicle position and the drive support contents corresponding to them in the information storage 3B as the history information regardless of the magnitude of the motion of the driver. With the configuration, it can increase the volume of the history information, and can improve the reliability of the decision of the drive support.

Furthermore, according to the present embodiment 5, it comprises the input unit 9 that receives information from outside, wherein the external equipment stores the history information including the motion pattern of the driver to be provided with the drive support together with the magnitude of the motion, and wherein when the controller 4D decides from the positional information of the vehicle the positional information acquiring unit 7 acquires that the vehicle is approaching the location where the drive support in the history information the communication unit 8 receives from the external equipment was given, and when the state of the vehicle the vehicle information indicates corresponds to the state of the vehicle in the history information, the controller 4D compares the magnitude of the motion in the history information with the magnitude of the motion set in advance via the input unit 9 for giving the drive support, and when the magnitude of the motion in the history information satisfies the magnitude of the motion set in advance for giving the drive support, the controller 4D presents the drive support contents in the history information regardless of the motion of the driver. Thus, it can give the drive support in advance before the driver takes a specific action, while improving the reliability of the decision as to whether the driver takes a support target action or not.

Furthermore, according to the present embodiment 5, when the motion of the driver matches the motion pattern of the driver to be provided with the drive support, and when the state of the vehicle the vehicle information indicates corresponds to the state of the vehicle to be provided with the drive support, the controller 4D transmits the motion pattern, the state of the vehicle, the vehicle position and the drive support contents corresponding to them to the external equipment via the communication unit 8 regardless of the magnitude of the motion of the driver, and causes the external equipment to store the transmitted contents as the history information. Thus, it can also increase the volume of the history information, and can improve the reliability of the decision of the drive support.

Embodiment 6

Figure 12:
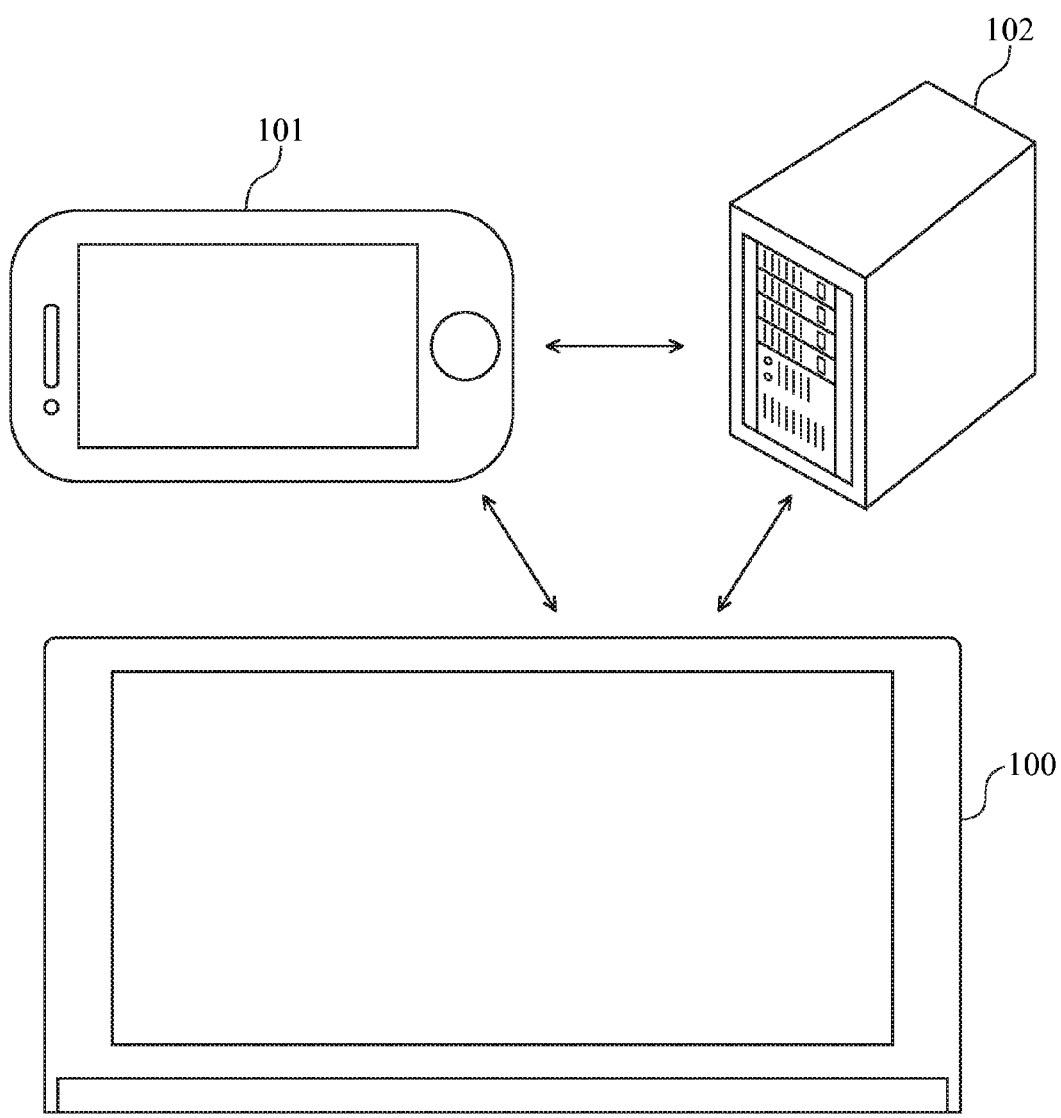
FIG. 12 is a diagram showing an outline of a drive support system of an embodiment 6 in accordance with the present invention.

FIG. 12 is a diagram showing an outline of a drive support system of an embodiment 6 in accordance with the present invention.

In the drive support system shown in FIG. 12, onboard equipment 100 presents drive support contents in cooperation with a portable terminal 101 and a server 102. A configuration of the drive support system will be described below.

First, an example will be described in which the onboard equipment 100 functions as an information presentation system that presents drive support contents in cooperation with the server 102.

It is conceivable in the configuration that the onboard equipment 100 carries out communication directly with the server 102, or that the onboard equipment 100 carries out communication with the server 102 via the portable terminal 101.

The server 102 comprises the information storage 3 and the controller 4 shown in the foregoing embodiment 1 in addition to the communication unit for carrying out the communication described above.

The onboard equipment 100 is a display system comprising the motion information acquiring unit 1, the vehicle information acquiring unit 2, the presentation data acquiring unit 5, the information presentation unit 6 and the communication unit 8 for carrying out communication with the server 102.

In this case, the server 102 receives from the onboard equipment 100 the information the motion information acquiring unit 1 and vehicle information acquiring unit 2 acquire, and decides from the information and the support condition data stored in the information storage 3 the drive support contents corresponding to the motion pattern matching the motion information of the driver and to the state of the vehicle the vehicle information indicates.

Then, the server 102 sends the drive support contents decided to the onboard equipment 100 via the communication unit to cause the information presentation unit 6 to present them.

Next, an example will be described in which the onboard equipment 100 functions as the information presentation system that presents the drive support contents in cooperation with the portable terminal 101.

It is conceivable in the configuration that the onboard equipment 100 carries out communication with the portable terminal 101.

The onboard equipment 100 is an information presentation system comprising the information presentation unit 6, and the communication unit 8 that carries out communication with the portable terminal 101.

The portable terminal 101 comprises a communication unit that carries out communication with the onboard equipment 100, the motion information acquiring unit 1, the vehicle information acquiring unit 2, the controller 4 and the presentation data acquiring unit 5.

The server 102 comprises the information storage 3 that stores the support condition data.

In this case, according to the support condition data recording the drive support contents which correspond to the motion pattern of the driver to be provided with the drive support and which correspond to the state of the vehicle, the controller 4 of the portable terminal 101 decides the drive support contents corresponding to the motion pattern matching the motion information of the driver and to the state of the vehicle the vehicle information indicates.

Then, the portable terminal 101 sends the drive support contents decided to the onboard equipment 100 via the communication unit to cause the information presentation unit 6 to present the drive support contents.

As described above, according to the present embodiment 6, in the portable terminal 101, the motion information acquiring unit 1 acquires the motion information of the driver of the vehicle; the vehicle information acquiring unit 2 acquires vehicle information about the state of the vehicle; the controller 4 decides the drive support contents which correspond to the motion pattern matching the motion information of the driver and to the state of the vehicle the vehicle information indicates in accordance with the support condition data that records drive support contents which correspond to the motion pattern of the driver to be provided with drive support and to the state of the vehicle; and the communication unit 8 transmits the drive support contents the controller decides to the onboard equipment 100 to be presented.

With the configuration, it can also execute the drive support taking as an opportunity the specific action the driver takes naturally in a prescribed vehicle state. Accordingly, it can give the drive support with appropriate contents at appropriate timing for the driver.

Incidentally, it is to be understood that a free combination of the individual embodiments, variations of any components of the individual embodiments or removal of any components of the individual embodiments is possible within the scope of the present invention.

INDUSTRIAL APPLICABILITY

A drive support system in accordance with the present invention can give drive support with appropriate contents at appropriate timing for a driver. Accordingly, it has a wide industrial applicability in a field of safety technology of vehicles.

DESCRIPTION OF REFERENCE SYMBOLS 1 motion information acquiring unit; 2 vehicle information acquiring unit; 3, 3A, 3B information storage; 4, 4A-4D controller; 5 presentation data acquiring unit; 6 information presentation unit; 7 positional information acquiring unit; 8 communication unit; 30 map DB; 40 motion deciding unit; 41 vehicle state deciding unit; 42 support data output unit; 43 history information management unit; 44 map information deciding unit; 45 communication management unit; 100 onboard equipment; 101 portable terminal; 102 server.

What is claimed is:

1. A drive support system comprising:
a motion information acquiring unit that acquires motion information of a driver of a vehicle;
a vehicle information acquiring unit that acquires vehicle information about a state of the vehicle;
an information storage that stores as history information a location where the drive support was given and drive support contents corresponding to the state of the vehicle at the time;
a positional information acquiring unit that acquires positional information of the vehicle;
a controller that decides drive support contents corresponding to a motion pattern matching the motion information of the driver and the state of the vehicle that the vehicle information indicates from support condition data which records the drive support contents corresponding to the motion pattern of the driver to be provided with drive support and the state of the vehicle, and that selects the drive support contents in the history information when the controller decides from the positional information of the vehicle that the positional information acquiring unit acquires, that the vehicle is approaching the location where the drive support in the history information was given, and when the state of the vehicle that the vehicle information indicates matches the state of the vehicle in the history information; and an information presentator that presents the drive support contents the controller decides or the drive support contents the controller selects.

2. The drive support system according to claim 1, further comprising:

a presentation data acquiring unit that acquires information inside and outside the vehicle to be used for the drive support, wherein the controller selects as drive support information, from among the information inside and outside the vehicle the presentation data acquiring unit acquires, information corresponding to the drive support contents the controller decides; and the information presentator presents the information inside and outside the vehicle the controller selects.

3. The drive support system according to claim 1, wherein the support condition data records drive support contents corresponding to a motion pattern of the driver and a state of the vehicle in accordance with operating skills of the driver; and the controller decides, from the support condition data corresponding to the operating skills of the driver, the drive support contents corresponding to the motion pattern matching the motion information of the driver and the state of the vehicle the vehicle information indicates.

4. The drive support system according to claim 1, wherein the controller decides a location where the vehicle is present from map information acquired from a map database and from the positional information of the vehicle that the positional information acquiring unit acquires, and wherein according to the support condition data recording the drive support contents which correspond to the map information on the location where the drive support is to be given, the motion pattern of the driver, and the state of the vehicle, the controller decides the drive support contents that correspond to the location decided, the motion pattern matching the motion information of the driver, and the state of the vehicle the vehicle information indicates.

5. The drive support system according to claim 1, wherein when the motion information of the driver the motion information acquiring unit acquires is associated with a motion pattern requesting drive support, the controller presents the drive support contents requested by the driver.

6. The drive support system according to claim 5, wherein the controller decides the drive support contents the driver requests from the motion information the motion information acquiring unit acquires.

7. The drive support system according to claim 6, wherein the controller decides a direction the driver indicates from the motion information of the driver that the motion information acquiring unit acquires, and retrieves facility information about a facility existing in the direction the driver indicates from map information acquired from a map database and the positional information of the vehicle that the positional information acquiring unit acquires; and the information presentator presents the facility information the controller retrieves.

8. The drive support system according to claim 1, further comprising: a communicator that carries out communication with external equipment that stores as history information a location where the drive support was given and the drive support contents corresponding to the state of the vehicle at the time, wherein when the controller decides from the positional information of the vehicle that the positional information acquiring unit acquires that the vehicle is approaching the location where the drive support was given and which is recorded in the history information the communicator receives from the external equipment, and when the state of the vehicle the vehicle information indicates corresponds to the state of the vehicle in the history information, the controller selects the drive support contents in the history information; and the information presentator presents the drive support contents that the controller selects.

9. The drive support system according to claim 1, wherein the support condition data records magnitude of a motion of a motion pattern of the driver to be provided with the drive support; and the controller compares the magnitude of the motion determined from the motion information of the driver with the magnitude of the motion of the motion pattern recorded in the support condition data corresponding to the motion information, and decides from a compared result whether the motion of the driver matches the motion pattern or not.

10. The drive support system according to claim 9, further comprising:

an input unit that receives information from outside, wherein the controller receives from the input unit the magnitude of the motion of a motion pattern of the driver to be provided with the drive support, and records the magnitude of the motion in the support condition data.

11. The drive support system according to claim 1, further comprising: an input unit that receives information from outside, wherein the information storage stores the history information including a motion pattern of the driver to be provided with the drive support together with the magnitude of the motion; and wherein when the controller decides from the positional information of the vehicle the positional information acquiring unit acquires that the vehicle is approaching the location where the drive support in the history information was given, and when the state of the vehicle that the vehicle information indicates corresponds to the state of the vehicle in the history information, the controller compares the magnitude of the motion in the history information with the magnitude of the motion for giving the drive support set in advance via the input unit, and when the magnitude of the motion in the history information satisfies the magnitude of the motion set in advance for giving the drive support, the controller presents the drive support contents in the history information regardless of the motion of the driver.

12. The drive support system according to claim 11, wherein when the motion of the driver matches the motion pattern of the driver to be provided with the drive support, and when the state of the vehicle the vehicle information indicates corresponds to the state of the vehicle to be provided with the drive support, the controller stores the motion pattern, the state of the vehicle, the vehicle position and the drive support contents corresponding to them in the information storage as the history information regardless of the magnitude of the motion of the driver.

13. The drive support system according to claim 8, further comprising: an input unit that receives information from outside, wherein the external equipment stores the history information including the motion pattern of the driver to be provided with the drive support and magnitude of the motion, and wherein when the controller decides from the positional information of the vehicle that the positional information acquiring unit acquires that the vehicle is approaching the location where the drive support in the history information the communicator receives from the external equipment was given, and when the state of the vehicle that the vehicle information indicates corresponds to the state of the vehicle in the history information, the controller compares the magnitude of the motion in the history information with the magnitude of the motion set in advance via the input unit for giving the drive support, and when the magnitude of the motion in the history information satisfies the magnitude of the motion set in advance for giving the drive support, the controller presents the drive support contents in the history information regardless of the motion of the driver.

14. The drive support system according to claim 13, wherein when the motion of the driver matches the motion pattern of the driver to be provided with the drive support, and when the state of the vehicle that the vehicle information indicates corresponds to the state of the vehicle to be provided with the drive support, the controller transmits the motion pattern, the state of the vehicle, the vehicle position and the drive support contents corresponding to them to the external equipment via the communicator regardless of the magnitude of the motion of the driver, and causes the external equipment to store the transmitted contents as the history information.

15. A drive support method that causes an information presentation system mounted on a vehicle to present drive support contents, the drive support method comprising the steps of:
- acquiring motion information of a driver of the vehicle through a motion information acquiring unit;
- acquiring vehicle information about a state of the vehicle through a vehicle information acquiring unit;
- storing as history information a location where the drive support was given and drive support contents corresponding to the state of the vehicle at the time in an information storage;
- acquiring positional information of the vehicle through a positional information acquiring unit;
- deciding, by a controller, drive support contents which correspond to a motion pattern matching the motion information of the driver and the state of the vehicle, the vehicle information indicates in accordance with support condition data that records drive support contents which correspond to the motion pattern of the driver to be provided with drive support and the state of the vehicle, and selecting the drive support contents in the history information when the controller decides from the positional information of the vehicle that the positional information acquiring unit acquires, that the vehicle is approaching the location where the drive support in the history information was given, and when the state of the vehicle that the vehicle information indicates matches the state of the vehicle in the history information;
- transmitting via a communicator the drive support contents the controller decides to the information presentation system to cause the information presentation system to present the drive support contents; and
- transmitting the drive support contents the controller selects to the information presentation system to cause the information presentation system to present the drive support contents.

* * * * *